United States Patent
Nagakura et al.

(10) Patent No.: US 11,097,162 B2
(45) Date of Patent: *Aug. 24, 2021

(54) GOLF BALL

(71) Applicant: SUMITOMO RUBBER INDUSTRIES, LTD., Kobe (JP)

(72) Inventors: Hikaru Nagakura, Kobe (JP); Kazuyoshi Shiga, Kobe (JP); Ryota Sakamine, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 74 days.

This patent is subject to a terminal disclaimer.

(21) Appl. No.: 16/586,395

(22) Filed: Sep. 27, 2019

(65) Prior Publication Data

US 2020/0101354 A1 Apr. 2, 2020

(30) Foreign Application Priority Data

Sep. 28, 2018 (JP) .............................. JP2018-185319

(51) Int. Cl.
*A63B 37/04* (2006.01)
*C08L 9/00* (2006.01)
*A63B 37/00* (2006.01)

(52) U.S. Cl.
CPC ...... *A63B 37/0051* (2013.01); *A63B 37/0063* (2013.01); *A63B 37/0074* (2013.01); *C08L 9/00* (2013.01); *A63B 37/0053* (2013.01); *A63B 37/0064* (2013.01); *A63B 37/0075* (2013.01); *A63B 37/0076* (2013.01)

(58) Field of Classification Search
None
See application file for complete search history.

(56) References Cited

U.S. PATENT DOCUMENTS

| | | | | |
|---|---|---|---|---|
| 4,373,041 A | * | 2/1983 | Wood | C08K 5/548 524/270 |
| 4,955,966 A | * | 9/1990 | Yuki | A63B 37/0051 473/359 |
| 6,287,218 B1 | * | 9/2001 | Ohama | A63B 37/0003 473/377 |
| 6,575,850 B1 | | 6/2003 | Iwami et al. | |
| 2001/0031670 A1 | * | 10/2001 | Iwami | A63B 37/0003 473/371 |
| 2005/0137030 A1 | | 6/2005 | Sullivan | |
| 2006/0264269 A1 | | 11/2006 | Rajagopalan et al. | |
| 2007/0129172 A1 | | 6/2007 | Cavallaro | |
| 2013/0307182 A1 | | 11/2013 | Okabe et al. | |
| 2018/0093138 A1 | | 4/2018 | Tarao et al. | |
| 2020/0101353 A1 | * | 4/2020 | Nagakura | A63B 37/0074 |
| 2020/0129815 A1 | * | 4/2020 | Hayashi | A63B 37/0076 |
| 2020/0206573 A1 | * | 7/2020 | Takihara | A63B 37/0063 |
| 2020/0206574 A1 | * | 7/2020 | Inoue | C08L 23/12 |
| 2020/0206576 A1 | * | 7/2020 | Takihara | A63B 37/0054 |
| 2020/0376347 A1 | * | 12/2020 | Hayashi | A63B 37/0051 |
| 2021/0002459 A1 | * | 1/2021 | Hayashi | A63B 37/0083 |

FOREIGN PATENT DOCUMENTS

| | | |
|---|---|---|
| JP | 63-54181 A | 3/1988 |
| JP | 2001-137386 A | 5/2001 |
| JP | 2005-185836 A | 7/2005 |
| JP | 2006-320725 A | 11/2006 |
| JP | 2008-126062 A | 6/2008 |
| JP | 2016019620 * | 2/2016 |

OTHER PUBLICATIONS

Pinova product literature for Piccolyte A115; 2011; pp. 1-2. (Year: 2011).*
Extended European Search Report, dated Mar. 4, 2020, for European Application No. 19197290.0.

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent shot feeling on driver shots. The present invention provides a golf ball comprising a core and at least one cover covering the core, wherein the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin.

19 Claims, 1 Drawing Sheet

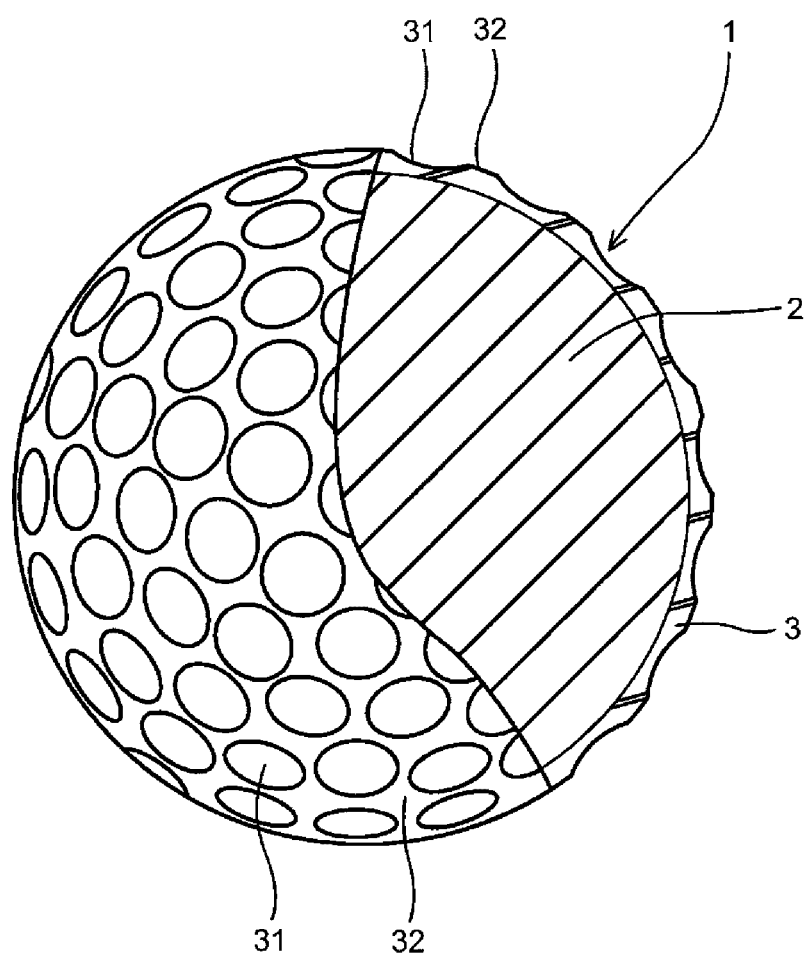

GOLF BALL

FIELD OF THE INVENTION

The present invention relates to a golf ball, more specifically relates to an improvement in a core of a golf ball.

DESCRIPTION OF THE RELATED ART

As a material for forming a core of a golf ball, a rubber composition containing a base rubber, a co-crosslinking agent, and a crosslinking initiator is widely used, in light of its good resilience.

For example, JP 2016-019620 A discloses a golf ball comprising a spherical core and at least one cover covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a petroleum resin, and further containing (e) a metal compound in case that (b) the co-crosslinking agent consists of the α,β-unsaturated carboxylic acid having 3 to 8 carbon atoms.

In addition, JP S63-54181 A discloses a golf ball comprising a core, wherein the core is composed of a viscoelastic material having a rebound resilience (based on JIS K 630) of 40% or less and an interior loss coefficient tan δ showing a maximum value of 0.3 or more at a range of from 0° C. to 40° C., and a constituent material of the core is a rubber composition obtained by blending an ordinary additive such as a vulcanization agent, a vulcanization accelerator, a lubricant or a plasticizer, and further a large amount of a filler, a softening agent or a resin such as a petroleum resin or a terpene resin into butyl rubber, ethylene-propylene-diene terpolymer, high styrene rubber, ethylene-propylene rubber, styrene-butadiene rubber, acrylonitrile-butadiene rubber or norbornene polymer.

JP 2008-126062 A discloses a multipiece golf ball comprising at least three core layers including a center, an inner core layer and an outer core layer, at least one cover, and at least one water vapor barrier layer disposed between the outer core layer and the at least one cover to realize greater water vapor permeability than the cover, wherein a hardness gradient is provided to the center, the inner core layer and the outer core layer, and discloses a terpene resin, a terpene resin ester or the like may be added in the water vapor barrier layer.

JP 2006-320725 A discloses a golf ball comprising a core, an intermediate layer and a cover, wherein the intermediate layer is produced from a composition containing an ionomer resin and a rosin material having a softening point of at least about 50° C.

JP 2005-185836 A discloses a golf ball comprising a core and a cover, wherein at least one of the core and the cover contains a plasticized polyurethane composition containing at least one polyurethane and at least one plasticizer.

JP 2001-137386 A discloses a golf ball comprising a core and a cover, wherein the cover has a loss tangent (tan δ) value in a range of from 0.15 to 0.70 at −10° C. in a temperature distribution curve for dynamic viscoelasticity measured in a tensile mode under conditions of temperature rising rate: 4° C./min, frequency: 10 Hz, initial strain: 1.0 mm, and the cover composition contains a material consisting of an ionomer resin, or a mixed material primarily containing an ionomer resin and further containing one or at least two elastomers having a rubber element, and a terpene resin and/or a rosin ester resin used as a tackifier.

SUMMARY OF THE INVENTION

An object of the present invention is to provide a golf ball having excellent shot feeling on driver shots by improving a core of the golf ball.

The present invention provides a golf ball comprising a core and at least one cover covering the core, wherein the core is formed from a core rubber composition containing (a) a base rubber containing a polybutadiene. (b) an α,β-unsaturated carboxylic acid having 3 to 8 carbon atoms and/or a metal salt thereof as a co-crosslinking agent, (c) a crosslinking initiator, and (d) a terpene-based resin.

The core formed from the rubber composition containing (d) the terpene-based resin has a lowered hardness on the core surface portion. As a result, a golf ball having excellent shot feeling on driver shots is obtained.

According to the present invention, a golf ball having excellent shot feeling on driver shots can be provided.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a core and at least one cover covering the core, wherein the core is formed from a core rubber composition containing (a) a base rubber containing a polybutadiene. (b) an α,β-unsaturated carboxylic acid having 3 to 8 carbon atoms and/or a metal salt thereof as a co-crosslinking agent, (c) a crosslinking initiator, and (d) a terpene-based resin. In the followings, the materials used for the present invention will be described.

[(a) Base Rubber]

(a) The base rubber used for the core rubber composition according to the present invention preferably contains a polybutadiene. As the polybutadiene, a high-cis polybutadiene having a cis-1,4 bond in an amount of 90 mass % or more (hereinafter sometimes simply referred to as "high-cis polybutadiene") is preferable.

The high-cis polybutadiene preferably has a 1,2-vinyl bond in an amount of 2.0 mass % or less, more preferably 1.7 mass % or less, and even more preferably 1.5 mass % or less. This is because if the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The polybutadiene preferably has a Mooney viscosity $(ML_{1+4}\ (100°\ C.))$ of 30 or more, more preferably 32 or more, and even more preferably 35 or more, and preferably has a Mooney viscosity $(ML_{1+4}\ (100°\ C.))$ of 140 or less, more preferably 120 or less, even more preferably 100 or less, and most preferably 80 or less. It is noted that the Mooney viscosity $(ML_{1+4}\ (100°\ C.))$ in the present invention is a value measured according to JIS K6300 using an L rotor under the conditions of preheating time: 1 minute, rotor rotation time: 4 minutes, and temperature: 100° C.

The polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. This is because if the molecular weight distribution (Mw/Mn) of the polybutadiene is excessively low, the processability may deteriorate, and if the molecular weight distribution (Mw/Mn) of the polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

From the viewpoint of obtaining a core having higher resilience, the amount of the polybutadiene in the base rubber is preferably 60 mass % or more, more preferably 80 mass % or more, and even more preferably 90 mass % or more. It is also preferred that (a) the base rubber consists of the polybutadiene.

(a) The base rubber may further contain another rubber in addition to the polybutadiene rubber. Examples of another rubber include natural rubber, polyisoprene rubber, styrene polybutadiene rubber, and ethylene-propylene-diene rubber (EPDM). These rubbers may be used solely or in combination of at least two of them.

[(b) Co-Crosslinking Agent]

(b) The α,β-unsaturated carboxylic acid having 3 to 8 carbon atoms and/or the metal salt thereof used in the core rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium is preferred. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferred, because zinc acrylate enhances the resilience of the resultant golf ball. The α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the core formed from the core rubber composition, which tends to lower the resilience of the obtained golf ball. On the other hand, if the amount of the α,β-unsaturated carboxylic acid having 3 to 8 carbon atoms and/or the metal salt thereof is more than 50 parts by mass, the core formed from the core rubber composition becomes so hard that the shot feeling of the obtained golf ball may be lowered.

[(c) Crosslinking Initiator]

(c) The crosslinking initiator used in the core rubber composition is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the core formed from the core rubber composition becomes so soft that the resilience of the obtained golf ball may be lowered. If the amount of (c) the crosslinking initiator is more than 5.0 parts by mass, the amount of (b) the co-crosslinking agent which has been explained above must be decreased in order to obtain an appropriate hardness of the core formed from the core rubber composition, which may lower the resilience of the obtained golf ball or worsen the durability of the obtained golf ball.

[(d) Terpene-Based Resin]

The terpene-based resin used in the present invention is not particularly limited, as long as it is a polymer having a terpene compound as a constituent component. The terpene-based resin is preferably, for example, at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

The terpene polymer is a homopolymer obtained by polymerizing a terpene compound. The terpene compound includes a hydrocarbon represented by a composition of $(C_5H_8)_n$, and an oxygen-containing derivative thereof, and is a compound having a terpene such as monoterpene $(C_{10}H_{15})$, sesquiterpene $(C_{15}H_{24})$ or diterpene $(C_{20}H_{32})$ as a basic skeleton. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. The terpene compound may be used solely or used as a mixture of two or more of them.

The terpene polymer is obtained, for example, by polymerizing the above terpene compound. Examples of the terpene polymer include α-pinene polymer, β-pinene polymer, limonene polymer, dipentene polymer, and f-pinene/limonene polymer.

The terpene-phenol copolymer (hereinafter sometimes simply referred to as "terpene phenolic resin") is, for example, a copolymer of the above terpene compound and a phenol-based compound. Examples of the phenol-based compound include phenol, cresol, xylenol, catechol, resorcin, hydroquinone, and bisphenol A. As the terpene-phenol copolymer, the copolymer of the above terpene compound and phenol is preferable.

The acid value of the terpene-phenol copolymer is preferably 10 mgKOH/g or more, more preferably 35 mgKOH/g or more, and even more preferably 60 mgKOHg or more. In addition, the acid value of the terpene-phenol copolymer is preferably 300 mgKOH/g or less, more preferably 250 mgKOH/g or less, even more preferably 200 mgKOH/g or less, particularly preferably 150 mgKOH/g or less, and most preferably 90 mgKOH/g or less. It is noted that, in the present invention, the acid value of the terpene-phenol copolymer is an amount in milligram of potassium hydroxide required for neutralizing the acid included in one gram of the terpene-phenol copolymer, and is a value measured by a potentiometric titration method (JIS K 0070: 1992).

The hydroxy value of the terpene-phenol copolymer is preferably 30 mgKOH/g or more, more preferably 50 mgKOH/g or more. The hydroxy value of the terpene-phenol copolymer is preferably 150 mgKOH/g or less, more preferably 100 mgKOH/g or less. It is noted that, in the present specification, the hydroxy value is an amount in milligram of potassium hydroxide required for neutralizing acetic acid bonding to hydroxyl group when one gram of the resin is acetylated, and is a value measured by a potentiometric titration method (JIS K 0070: 1992).

The terpene-styrene copolymer is, for example, a copolymer of the above terpene compound and a styrene-based compound. Examples of the styrene-based compound include styrene, and α-methylstyrene. As the terpene-styrene copolymer, the copolymer of the above terpene compound and α-methylstyrene is preferable.

The terpene-phenol-styrene copolymer is, for example, a copolymer of the above terpene compound, the above phenolic compound and the above styrene-based compound. As the terpene-phenol-styrene copolymer, the copolymer of the above terpene compound, phenol and α-methylstyrene is preferable.

The hydrogenated terpene-phenol copolymer is one obtained by hydrogenating the above terpene-phenol copolymer. The hydrogenated terpene-styrene copolymer is one obtained by hydrogenating the above terpene-styrene copolymer. The hydrogenated terpene-phenol-styrene copolymer is one obtained by hydrogenating the above terpene-phenol-styrene copolymer.

As (d) the terpene-based resin, at least one member selected from the group consisting of compounds having a structure represented by the following formulae (1) to (4) is preferable.

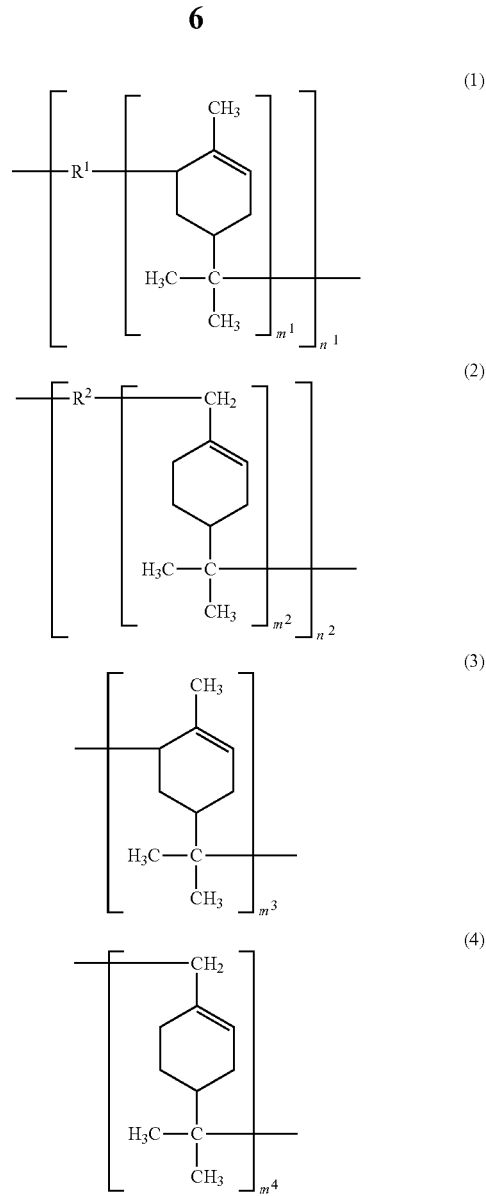

[In the formulae (1) to (4), $R^1$ and $R^2$ each independently represent a divalent residue of a phenol-based compound and/or a styrene-based compound, $m^1$ to $m^4$ each independently represent a natural number of 1 to 30, and $n^1$ to $n^2$ each independently represent a natural number of 1 to 20.]

The compounds having the structure represented by the above formulae (1) to (4) each have a structure derived from pinene in the molecule.

The compound having the structure represented by the formula (1) has a repeating unit consisting of a structural moiety derived from α-pinene and $R^1$ bonding to the structural moiety derived from α-pinene. $R^1$ is preferably a divalent residue where two hydrogen atoms are removed from benzene ring of a phenolic compound and/or a styrene-based compound. Examples of the compound having the structure represented by the formula (1) include a copolymer of α-pinene and a phenol-based compound and/or a styrene-based compound.

Examples of the phenol-based compound include phenol, cresol, xylenol, catechol, resorcin, hydroquinone, and bisphenol A. Examples of the styrene-based compound include styrene, and α-methylstyrene.

In the formula (1), $m^1$ represents the degree of polymerization of the structural unit derived from α-pinene, and is preferably a natural number of 1 to 30. $m^1$ is preferably 1 or more, more preferably 2 or more, and even more preferably 3 or more, and is preferably 30 or less, more preferably 25 or less, and even more preferably 20 or less.

In the formula (1), $n^1$ represents the degree of polymerization of the repeating unit consisting of the structural moiety derived from α-pinene and $R^1$ bonding to the structural moiety derived from α-pinene, and is preferably a natural number of 1 to 20. $n^1$ is preferably 1 or more, more preferably 2 or more, and even more preferably 3 or more, and is preferably 20 or less, more preferably 18 or less, and even more preferably 15 or less.

The compound having the structure represented by the formula (2) has a repeating unit consisting of a structural moiety derived from β-pinene and $R^2$ bonding to the structural moiety in the molecule. Examples of the compound having the structure represented by the formula (2) include a copolymer of β-pinene and a phenol-based compound and/or a styrene-based compound. $R^2$ is a divalent residue where two hydrogen atoms are removed from benzene ring of a phenol-based compound and/or a styrene-based compound.

Examples of the phenol-based compound include phenol, cresol, xylenol, catechol, resorcin, hydroquinone, and bisphenol A. Examples of the styrene-based compound include styrene, and α-methylstyrene.

In the formula (2), $m^2$ represents the degree of polymerization of the structural unit derived from R-pinene, and is preferably a natural number of 1 to 30. $m^2$ is preferably 1 or more, more preferably 2 or more, and even more preferably 3 or more, and is preferably 30 or less, more preferably 25 or less, and even more preferably 20 or less.

In the formula (2), $n^2$ represents the degree of polymerization of the repeating unit consisting of a structural moiety derived from G-pinene and $R^2$ bonding to the structural moiety, and is preferably a natural number of 1 to 20. $n^2$ is preferably 1 or more, more preferably 2 or more, and even more preferably 3 or more, and is preferably 20 or less, more preferably 18 or less, and even more preferably 15 or less.

The compound having the structure represented by the formula (3) is a polymer having a structural unit derived from α-pinene, and is more preferably a polymer consisting of the structural unit derived from α-pinene.

In the formula (3), $m^3$ represents the degree of polymerization of the structural unit derived from α-pinene, and is preferably a natural number of 1 to 30. $m^3$ is preferably 1 or more, more preferably 2 or more, and even more preferably 3 or more, and is preferably 30 or less, more preferably 25 or less, and even more preferably 20 or less.

The compound having the structure represented by the formula (4) is a β-pinene polymer having a structural unit derived from β-pinene in the molecule, and is more preferably a polymer consisting of the structural unit derived from β-pinene.

In the formula (4), $m^4$ represents the degree of polymerization of the structural unit derived from β-pinene, and is preferably a natural number of 1 to 30. $m^4$ is preferably 1 or more, more preferably 2 or more, and even more preferably 3 or more, and is preferably 30 or less, more preferably 25 or less, and even more preferably 20 or less.

Particularly preferable examples of (d) the terpene-based resin include α-pinene-phenol copolymer, α-pinene-α-methylstyrene copolymer, α-pinene-α-methylstyrene-phenol copolymer, β-pinene-phenol copolymer, β-pinene-α-methylstyrene copolymer, and β-pinene-α-methylstyrene-phenol copolymer. As (d) the terpene-based resin, these copolymers may be used solely, or two or more of them may be used in combination.

The softening point of (d) the terpene-based resin is preferably 60° C. or more, more preferably 80° C. or more, and even more preferably 100° C. or more, and is preferably 150° C. or less, more preferably 130° C. or less, and even more preferably 120° C. or less. This is because use of (d) the terpene-based resin having the softening point falling within the above range improves the dispersibility of the resin during kneading the rubber. It is noted that the softening point of (d) the terpene-based resin is measured with a ring and ball type softening point measuring apparatus according to JIS K 6220-1: 2001, and is a temperature at which the ball drops.

As (d) the terpene-based resin, a commercial product can be used. Examples of the commercial product include Sylvares TP2019 and Sylvatraxx 6720 available from Kraton Corporation; and YS RESIN PX 1150N available from Yasuhara Chemical Co. Ltd.

The amount of (d) the terpene-based resin is preferably 3 parts by mass or more, more preferably 4 parts by mass or more, and even more preferably 5 parts by mass or more, and is preferably 20 parts by mass or less, more preferably 18 parts by mass or less, and even more preferably 15 parts by mass or less, with respect to 100 parts by mass of (a) the base rubber. If the amount of the component (d) is less than 3 parts by mass, the effect of adding the component (d) is small, and thus the improvement effect on the shot feeling on driver shots may not be obtained. On the other hand, if the amount of the component (d) is more than 20 parts by mass, the obtained core becomes excessively soft as a whole, and thus the resilience may be lowered.

The blending ratio (the component (b)/the component (d)) of the component (b) to the component (d) is preferably 2.0 or more, more preferably 2.5 or more, and even more preferably 2.8 or more, and is preferably 15.0 or less, more preferably 12.0 or less, even more preferably 10.0 or less, and most preferably 8.0 or less in a mass ratio. If the blending ratio (the component (b)/the component (d)) of the component (b) to the component (d) falls within the above range, the obtained golf ball has better shot feeling on driver shots.

[(e) Organic Sulfur Compound]

The core rubber composition preferably further contains (e) an organic sulfur compound. If (e) the organic sulfur compound is contained, the obtained core has higher resilience.

As (e) the organic sulfur compound, at least one compound selected from the group consisting of thiols (thiophenols and thionaphthols), polysulfides, thiurams, thiocarboxylic acids, dithiocarboxylic acids, sulfenamides, dithiocarbamates and thiazoles is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, and 2,4,5,6-tetrafluorothiophenol, pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, and 2,4,5,6-tetraiodothiophenol, pentaiodothiophenol; and metal salts thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include the zinc salt of 1-thionaphthol and the zinc salt of 2-thionaphthol.

The polysulfides are organic sulfur compounds having a polysulfide bond, and examples thereof include disulfides, trisulfides, and tetrasulfides. As the polysulfides, diphenylpolysulfides are preferable.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide. N-oxydiethylene-2-benzothiazole sulfenamide, and N-t-butyl-2-benzothiazole sulfenamide.

(e) The organic sulfur compound is preferably thiophenols and/or the metal salt thereof, thionaphthols and/or the metal salt thereof, diphenyldisulfides, and thiuramdisulfides, more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide.

(e) The organic sulfur compound may be used solely or in combination of at least two of them.

The amount of (e) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and thus the resilience of the golf ball may not be improved. In addition, if the amount of (e) the organic sulfur compound is more than 5.0 parts by mass, the obtained golf ball may have an excessively large compression deformation amount, and thus the resilience thereof may be lowered.

[(f) Metal Compound]

In the case that the core rubber composition contains only the $\alpha,\beta$-unsaturated carboxylic acid having 3 to 8 carbon atoms as the co-crosslinking agent, the core rubber composition preferably further contains (f) a metal compound. This is because neutralizing the $\alpha,\beta$-unsaturated carboxylic acid having 3 to 8 carbon atoms with the metal compound in the core rubber composition provides substantially the same effect as using the metal salt of the $\alpha,\beta$-unsaturated carboxylic acid having 3 to 8 carbon atoms as the co-crosslinking agent. It is noted that in case of using the $\alpha,\beta$-unsaturated carboxylic acid having 3 to 8 carbon atoms and the metal salt thereof in combination as the co-crosslinking agent, (f) the metal compound may be used as an optional component.

(f) The metal compound is not particularly limited as long as it neutralizes (b) the $\alpha,\beta$-unsaturated carboxylic acid having 3 to 8 carbon atoms in the core rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (f) The metal compound is preferably a divalent metal compound, more preferably a zinc compound. This is because the divalent metal compound reacts with the $\alpha,\beta$-unsaturated carboxylic acid having 3 to 8 carbon atoms, thereby forming a metal crosslinking. Further, use of the zinc compound provides a golf ball with higher resilience.

(f) The metal compound may be used solely or in combination of two or more of them. In addition, the amount of (f) the metal compound may be appropriately adjusted in accordance with the desired neutralization degree of (b) the $\alpha,\beta$-unsaturated carboxylic acid having 3 to 8 carbon atoms.

The core rubber composition used in the present invention may further contain additives such as a pigment, a filler for adjusting a weight or the like, an antioxidant, a peptizing agent, a softening agent or the like, where necessary.

The filler blended in the core rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of (a) the base rubber. This is because if the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

[Core]

The core of the golf ball according to the present invention can be obtained by mixing and kneading the above-described core rubber composition, and molding the kneaded product in a mold. The molding condition is not particularly limited, and the molding is generally carried out at 130° C. to 200° C. under a pressure of 2.9 MPa to 11.8 MPa for 10 minutes to 60 minutes. For example, it is preferred that the core rubber composition is heated at 130° C. to 200° C. for 10 to 60 minutes, or alternatively the core rubber composition is subjected to a two-step heating, i.e. the core rubber composition is heated at 130° C. to 150° C. for 20 to 40 minutes and then heated at 160° C. to 180° C. for 5 to 15 minutes.

In the core of the golf ball according to the present invention, the hardness (H75) at the point located at the distance of 75% of the core radius from a center of the core is preferably 55 or more, more preferably 60 or more, and even more preferably 65 or more, and is preferably 80 or less, more preferably 75 or less, and even more preferably 72 or less in Shore C hardness. If the hardness (H75) at the point located at the distance of 75% of the core radius is 55 or more in Shore C hardness, the resilience of the core is better. In addition, if the hardness (H75) at the point located at the distance of 75% of the core radius is 80 or less in Shore C hardness, the shot feeling of the core is better.

The surface hardness (Hs) of the core of the golf ball according to the present invention is preferably 60 or more, more preferably 62 or more, and even more preferably 65 or more, and is preferably 83 or less, more preferably 80 or less, and even more preferably 78 or less in Shore C hardness. If the surface hardness (Hs) of the core is 60 or more in Shore C hardness, the resilience of the core is better. In addition, if the surface hardness (Hs) of the core is 83 or less in Shore C hardness, the shot feeling on driver shots is further enhanced.

The center hardness (Ho) of the core is preferably 30 or more, more preferably 35 or more, and even more preferably 40 or more in Shore C hardness. If the center hardness (Ho) of the core is 30 or more in Shore C hardness, the core does not become excessively soft, and thus the resilience is better. In addition, the center hardness (Ho) of the core is preferably 70 or less, more preferably 68 or less, and even more preferably 67 or less in Shore C hardness. If the center hardness (Ho) is 70 or less in Shore C hardness, the core does not become excessively hard, and thus the shot feeling is better.

In the core of the golf ball according to the present invention, the hardness difference (Hs−H75) between the hardness (H75) at the point located at the distance of 75% of the core radius and the surface hardness (Hs) of the core is preferably less than 10, more preferably 9 or less, even more preferably 8 or less, and most preferably 7 or less in Shore C hardness. If the hardness difference (Hs−H75) between the hardness (H75) at the point located at the distance of 75% of the core radius and the surface hardness (Hs) of the core is less than 10 in Shore C hardness, the part near the core surface becomes soft, and thus the shot feeling on driver shots is remarkably enhanced. In addition, the lower limit of the hardness difference (Hs−H75) between the hardness (H75) at the point located at the distance of 75% of the core radius and the surface hardness (Hs) of the core is not particularly limited, but the hardness difference (Hs−H75) between the hardness (H75) at the point located at the distance of 75% of the core radius and the surface hardness (Hs) of the core is preferably 0 or more, more preferably 1 or more, and even more preferably 2 or more in Shore C hardness.

The hardness difference (Hs−Ho) between the surface hardness (Hs) of the core and the center hardness (Ho) of the core is preferably 5 or more, more preferably 6 or more, and even more preferably 8 or more, and is preferably 35 or less, more preferably 30 or less, and even more preferably 25 or less in Shore C hardness. If the hardness difference (Hs−Ho) between the surface hardness (Hs) of the core and the center hardness (Ho) of the core is 5 or more in Shore C hardness, the obtained golf ball has better resilience. In addition, if the hardness difference (Hs−Ho) between the surface hardness (Hs) of the core and the center hardness (Ho) of the core is 35 or less in Shore C hardness, the obtained golf ball has further enhanced shot feeling on driver shots.

The hardness difference (H75−Ho) between the hardness (H75) at the point located at the distance of 75% of the core radius and the center hardness (Ho) of the core is preferably 3 or more, more preferably 5 or more, and even more preferably 7 or more, and is preferably 20 or less, more preferably 18 or less, and even more preferably 15 or less in Shore C hardness. If the hardness difference (H75−Ho) between the hardness (H75) at the point located at the distance of 75% of the core radius and the center hardness (Ho) of the core is 3 or more in Shore C hardness, the resilience of the core is better. In addition, if the hardness difference (H75−Ho) between the hardness (H75) at the point located at the distance of 75% of the core radius and the center hardness (Ho) of the core is 20 or less in Shore C hardness, the durability of the core is better.

The core of the golf ball according to the present invention preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the core has a diameter of 34.8 mm or more, the thickness of the cover does not become too thick and thus the resilience becomes better. On the other hand, if the core has a diameter of 42.2 mm or less, the thickness of the cover does not become too thin and thus the cover functions better.

When the core has a diameter in a range from 34.8 mm to 42.2 mm, the compression deformation amount of the core (shrinking amount of the core along the compression direction) when applying a load from an initial load of 98 N to a final load of 1275 N is preferably 2.0 mm or more, more preferably 2.3 mm or more, and even more preferably 2.5 mm or more, and is preferably 5.0 mm or less, more preferably 4.5 mm or less, and even more preferably 4.3 mm or less. If the compression deformation amount is 2.0 mm or more, the shot feeling becomes better and if the compression deformation amount is 5.0 mm or less, the resilience becomes better.

[Cover]

The cover of the golf ball of the present invention is formed from a cover composition containing a resin component. Examples of the resin component include an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation.

Examples of the ionomer resin include a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture of those. The olefin is preferably an olefin having 2 to 8 carbon atoms, and examples of the olefin include ethylene, propylene, butene, pentene, hexene, heptene, and octene. The olefin is more preferably ethylene. Examples of the α,β-unsaturated carboxylic acid having 3 to 8 carbon atoms include acrylic acid, methacrylic acid, fumaric acid, maleic acid, and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferred. Among these, the ionomer resin is preferably a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

The cover composition constituting the cover of the golf ball according to the present invention preferably contains, as a resin component, a thermoplastic polyurethane elastomer or an ionomer resin. In case of using the ionomer resin, it is preferred to use a thermoplastic styrene elastomer in combination. The amount of the polyurethane or ionomer resin in the resin component of the cover composition is preferably 50 mass % or more, more preferably 60 mass % or more, and even more preferably 70 mass % or more.

In addition to the above resin component, the cover composition may further contain a pigment component such as a white pigment (e.g. titanium oxide), a blue pigment and a red pigment; a weight adjusting agent such as zinc oxide, calcium carbonate and barium sulfate; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. This is because if the amount of the white pigment is 0.5 part by mass or more, it is possible to impart the opacity to the cover, and if the amount of the white pigment is more than 10 parts by mass, the durability of the obtained cover may deteriorate.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, and even more preferably 30 or more in Shore D hardness. If the cover composition has a slab hardness of less than 50 in Shore D hardness, the obtained golf ball readily stops on the green due to the high spin rate on approach shots. In addition, if the cover composition has a slab hardness of 20 or more in Shore D hardness, the abrasion resistance becomes better. In case of a plurality of cover layers, the slab hardness of the cover composition constituting each layer may be identical to or different from each other.

Examples of the method for molding the cover of the golf ball of the present invention include a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. In the case that the cover has a plurality of layers, it is preferred that the total thickness of the cover layers falls within the above range.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The golf ball construction of the present invention is not particularly limited, as long as the golf ball comprises a core and at least one cover covering the core. The FIGURE is a partially cutaway cross-sectional view of a golf ball according to one embodiment of the present invention. The golf ball 1 comprises a spherical core 2, and a cover 3 covering the spherical core 2. A plurality of dimples 31 are formed on the surface of the cover. Other portion than the dimples 31 on the surface of the golf ball 1 is a land 32. The golf ball 1 is provided with a paint layer and a mark layer outside the cover 3, but these layers are not depicted.

The core is preferably spherical. Further, the core may have either a single layered structure or a multiple layered structure, but the single layered structure is preferable. This is because unlike the core having the multiple layered structure, the core having the single layered structure does not have energy loss at the interface of the multiple layered structure when being hit, and thus has higher resilience. In addition, the cover has a structure composed of at least one layer, for example, a single layered structure, or a multiple layered structure composed of at least two layers. Examples of the golf ball according to the present invention include a two-piece golf ball composed of a core and a single layered cover disposed around the core; a multi-piece golf ball (including a three-piece golf ball) composed of a core and at least two cover layers disposed around the core; and a wound golf ball composed of a core, a rubber thread layer which is formed around the core, and a cover disposed around the rubber thread layer. The present invention can be suitably applied to any one of the above golf balls.

The golf ball of the present invention preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.3 mm or more, and even more preferably 2.5 mm or more, and is preferably 4.0 mm or less, more preferably 3.3 mm or less, and even more preferably 3.5 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount

A compression deformation amount of the core or golf ball (a shrinking amount of the core or golf ball along the compression direction), when applying a load from an initial load of 98 N to a final load of 1275 N to the core or golf ball, was measured.

(2) Core Hardness (Shore C Hardness)

The Shore C hardness measured with an automatic hardness tester Digitest II available from Bareiss company at the surface of the core was adopted as the surface hardness of the core. In addition, the core was cut into two hemispheres to obtain a cut plane, and the hardness at the central point of the cut plane and the hardness at the point located at the distance of 75% of the core radius from the central point of the cut plane were measured. It is noted that the hardness at the point located at the distance of 75% of the core radius from the central point of the cut plane was calculated by measuring the hardness values at four points located at the distance of 75% of the core radius from the central point of the cut plane and averaging the hardness values measured at the four points.

(3) Slab Hardness (Shore D Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Shot Feeling

An actual hitting test was carried out by ten amateur golfers (high skilled persons) using a driver. In accordance with the following grading standard, the feeling of each golfer at hitting the golf ball was evaluated. The shot feeling most evaluated by the ten golfers was adopted as the shot feeling of that golf ball.

Grading Standard

E (excellent): Impact is small and feeling is good.
G (good): There is impact but feeling is good one.
F (Fair): Normal
P (Poor): Impact is great and feeling is bad.

[Production of Golf Ball]

(1) Production of Core

The rubber compositions having the formulations shown in Tables 1 to 3 were kneaded with a kneading roll, and heat pressed in upper and lower molds, each having a hemispherical cavity, at 170° C. for 30 minutes to obtain spherical cores having a diameter of 40.0 mm. It is noted that barium sulfate was added in an appropriate amount such that the obtained golf balls had a mass of 45.3 g.

TABLE 1

| | | | Golf ball No. | | | | | | | |
|---|---|---|---|---|---|---|---|---|---|---|
| | | | 1 | 2 | 3 | 4 | 5 | 6 | 7 | Standard |
| Core rubber composition | Formulation (parts by mass) | (a) BR730 | 100 | 100 | 100 | 100 | 100 | 100 | 100 | 100 |
| | | (b) ZN-DA90S | 32 | 34 | 36 | 40 | 44 | 48 | 52 | 29 |
| | | (c) Dicumyl peroxide | 0.8 | 0.8 | 0.8 | 0.8 | 0.8 | 0.8 | 0.8 | 0.8 |
| | | (d) Sylvares TP2019 | 1 | 3 | 5 | 10 | 15 | 20 | 25 | 0 |
| | | (e) PBDS | 0.3 | 0.3 | 0.3 | 0.3 | 0.3 | 0.3 | 0.3 | 0.3 |
| | | (f) Zinc oxide | 5.0 | 5.0 | 5.0 | 5.0 | 5.0 | 5.0 | 5.0 | 5.0 |
| | | Barium sulfate | * | * | * | * | * | * | * | * |
| | Blending ratio (b)/(d) of component (b) to component (d) | | 32.0 | 11.3 | 7.2 | 4.0 | 2.9 | 2.4 | 2.1 | — |
| | Softening point of component (d) (° C.) | | 125 | 125 | 125 | 125 | 125 | 125 | 125 | — |
| Core | Compression deformation amount (mm) | | 3.3 | 3.3 | 3.3 | 3.3 | 3.3 | 3.3 | 3.3 | 3.3 |
| | Center hardness Ho (Shore C) | | 57.5 | 60.0 | 62.5 | 60.7 | 66.0 | 55.0 | 55.0 | 57.5 |
| | Hardness H75 at the distance of 75% from center (Shore C) | | 69.9 | 70.0 | 70.5 | 69.7 | 69.4 | 70.0 | 60.0 | 69.9 |
| | Surface hardness Hs (Shore C) | | 83.1 | 79.1 | 72.3 | 72.8 | 72.2 | 70.1 | 63.1 | 83.1 |
| | Hs − H75 | | 13.2 | 9.1 | 1.8 | 3.1 | 2.8 | 0.1 | 3.1 | 13.2 |
| | Hs − Ho | | 25.6 | 19.1 | 9.8 | 12.1 | 6.2 | 15.1 | 8.1 | 25.6 |
| Golf ball | Compression deformation amount (mm) | | 3.0 | 3.0 | 3.0 | 3.0 | 3.0 | 3.0 | 3.0 | 3.0 |
| | Shot feeling on driver shots | | F | G | E | E | E | G | F | P |

* Appropriate amount

TABLE 2

| | | | Golf ball No. | | | | | | | |
|---|---|---|---|---|---|---|---|---|---|---|
| | | | 8 | 9 | 10 | 11 | 12 | 13 | 14 | Standard |
| Rubber composition | Formulation (parts by mass) | (a) BR730 | 100 | 100 | 100 | 100 | 100 | 100 | 100 | 100 |
| | | (b) ZN-DA90S | 32 | 34 | 36 | 40 | 44 | 48 | 52 | 29 |
| | | (g) Dicumyl peroxide | 0.8 | 0.8 | 0.8 | 0.8 | 0.8 | 0.8 | 0.8 | 0.8 |
| | | (d) YS RESIN PX1150N | 1 | 3 | 5 | 10 | 15 | 20 | 25 | 0 |
| | | (e) PBDS | 0.3 | 0.3 | 0.3 | 0.3 | 0.3 | 0.3 | 0.3 | 0.3 |
| | | (f) Zinc oxide | 5.0 | 5.0 | 5.0 | 5.0 | 5.0 | 5.0 | 5.0 | 5.0 |
| | | Barium sulfate | * | * | * | * | * | * | * | * |
| | Blending ratio (b)/(d) of component (b) to component (d) | | 32.0 | 11.3 | 7.2 | 4.0 | 2.9 | 2.4 | 2.1 | — |
| | Softening point of component (d) (° C.) | | 115.0 | 115.0 | 115.0 | 115.0 | 115.0 | 115.0 | 115.0 | — |
| Core | Compression deformation amount (mm) | | 3.3 | 3.3 | 3.3 | 3.3 | 3.3 | 3.3 | 3.3 | 3.3 |
| | Center hardness Ho (Shore C) | | 57.5 | 58.0 | 58.8 | 59.6 | 53.8 | 55.0 | 55.0 | 57.5 |
| | Hardness H75 at the distance of 75% from center (Shore C) | | 69.9 | 70.0 | 71.8 | 70.8 | 67.4 | 70.0 | 60.0 | 69.9 |
| | Surface hardness Hs (Shore C) | | 83.1 | 79.1 | 78.5 | 75.5 | 72.6 | 70.1 | 63.1 | 83.1 |
| | Hs − H75 | | 13.2 | 9.1 | 6.7 | 4.7 | 5.2 | 0.1 | 3.1 | 13.2 |
| | Hs − Ho | | 25.6 | 21.1 | 19.7 | 15.9 | 18.8 | 15.1 | 8.1 | 25.6 |
| Golf ball | Compression deformation amount (mm) | | 3.0 | 3.0 | 3.0 | 3.0 | 3.0 | 3.0 | 3.0 | 3.0 |
| | Shot feeling on driver shots | | F | G | E | E | E | G | F | P |

* Appropriate amount

TABLE 3

| | | | \multicolumn{8}{c}{Golf ball No.} |
| | | | 15 | 16 | 17 | 18 | 19 | 20 | 21 | Standard |
|---|---|---|---|---|---|---|---|---|---|---|
| Rubber composition | Formulation (parts by mass) | (a) BR730 | 100 | 100 | 100 | 100 | 100 | 100 | 100 | 100 |
| | | (b) ZN-DA90S | 29 | 31 | 33 | 37 | 41 | 45 | 49 | 29 |
| | | (c) Dicumyl peroxide | 0.8 | 0.8 | 0.8 | 0.8 | 0.8 | 0.8 | 0.8 | 0.8 |
| | | (d) Sylvatraxx 6720 | 1 | 3 | 5 | 10 | 15 | 20 | 25 | 0 |
| | | (e) PBDS | 0.3 | 0.3 | 0.3 | 0.3 | 0.3 | 0.3 | 0.3 | 0.3 |
| | | (f) Zinc oxide | 5.0 | 5.0 | 5.0 | 5.0 | 5.0 | 5.0 | 5.0 | 5.0 |
| | | Barium sulfate | * | * | * | * | * | * | * | * |
| | Blending ratio (b)/(d) of component (b) to component (d) | | 29.0 | 10.3 | 6.6 | 3.7 | 2.7 | 2.3 | 2.0 | — |
| | Softening point of component (d) (° C.) | | 118 | 118 | 118 | 118 | 118 | 118 | 118 | — |
| Core | Compression deformation amount (mm) | | 3.3 | 3.3 | 3.3 | 3.3 | 3.3 | 3.3 | 3.3 | 3.3 |
| | Center hardness Ho (Shore C) | | 57.5 | 60.0 | 62.5 | 60.7 | 66.0 | 55.0 | 55.0 | 57.5 |
| | Hardness H75 at the distance of 75% from center (Shore C) | | 69.9 | 70.0 | 70.5 | 69.7 | 69.4 | 70.0 | 60.0 | 69.9 |
| | Surface hardness Hs (Shore C) | | 83.1 | 79.1 | 72.3 | 72.8 | 72.2 | 70.1 | 63.1 | 83.1 |
| | Hs − H75 | | 13.2 | 9.1 | 1.8 | 3.1 | 2.8 | 0.1 | 3.1 | 13.2 |
| | Hs − Ho | | 25.6 | 19.1 | 9.8 | 12.1 | 6.2 | 15.1 | 8.1 | 25.6 |
| Golf ball | Compression deformation amount (mm) | | 3.0 | 3.0 | 3.0 | 3.0 | 3.0 | 3.0 | 3.0 | 3.0 |
| | Shot feeling on driver shots | | F | G | E | E | E | G | F | P |

* Appropriate amount

The materials used in Tables 1 to 3 are shown below.

BR730: high-cis polybutadiene rubber (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation ZN-DA90S: zinc acrylate available from Nisshoku Techno Fine Chemical Co., Ltd.

Dicumyl peroxide: available from Tokyo Chemical Industry Co., Ltd.

Sylvares TP2019 (pinene-phenol copolymer, softening point: 125° C.): available from KRATON CORPORATION YS RESIN PX1150N (β-pinene polymer, softening point: 115±5° C.): available from Yasuhara Chemical Co. Ltd.

Sylvatraxx 6720 (pinene-α-methylstyrene-phenol copolymer, softening point: 118° C.): available from KRATON CORPORATION PBDS: bis(pentabromophenyl) disulfide available from Kawaguchi Chemical Industry Co., Ltd.

Zinc oxide: "Ginrei R" available from Toho Zinc Co., Ltd.

Barium sulfate: "Barium Sulfate BD" available from Sakai Chemical Industry Co., Ltd.

(2) Production of Cover and Production of Golf Ball

Cover materials having the formulation shown in Table 4 were extruded with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce a golf ball comprising a spherical core and a cover covering the spherical core. Evaluation results of the obtained golf balls are shown in Tables 1 to 3.

TABLE 4

| Cover composition No. | 1 |
|---|---|
| Himilan 1555 | 47 |
| Himilan 1557 | 46 |
| TEFABLOC T3221C | 7 |
| Titanium dioxide (A220) | 4 |
| JF-90 | 0.2 |
| Hardness (Shore D) | 57 |

Formulation: parts by mass

The materials used in Table 4 are shown below.

Himilan 1555: Na-neutralized ionomer available from Du Pont-Mitsui Polychemicals Co., Ltd.

Himilan 1557: Zn-neutralized ionomer available from Du Pont-Mitsui Polychemicals Co., Ltd.

TEFABLOC T3221C: thermoplastic elastomer containing styrene block available from Mitsubishi Chemical Corporation A220: titanium dioxide available from Ishihara Sangyo Kaisha, Ltd.

JF-90: light stabilizer available from Johoku chemical Co., Ltd.

As shown in Tables 1 to 3, the golf balls according to the present invention comprising a core and at least one cover covering the core, wherein the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin, each have excellent shot feeling on driver shots.

The golf ball according to the present invention has excellent shot feeling on driver shots. This application is based on Japanese patent application No. 2018-185319 filed on Sep. 28, 2018, the content of which is hereby incorporated by reference.

The invention claimed is:

1. A golf ball comprising a core and at least one cover covering the core, wherein
the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin; and wherein
a hardness difference (Hs−H75) between a hardness (H75) at a point located at a distance of 75% of a core radius from a center of the core and a surface hardness (Hs) of the core is less than 10 in Shore C hardness.

2. The golf ball according to claim 1, wherein (d) the terpene-based resin is at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

3. The golf ball according to claim 1, wherein the terpene-based resin is at least one member selected from the group consisting of compounds having a structure represented by the following formulae (1) to (4):

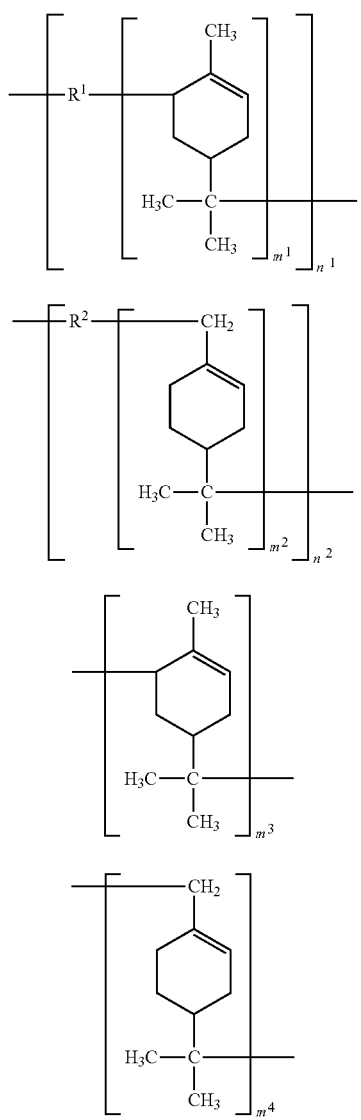

wherein in the formulae (1) to (4),
R$^1$ and R$^2$ each independently represent a divalent residue of a phenol-based compound and/or a styrene-based compound,
m$^1$ to m$^4$ each independently represent a natural number of 1 to 30, and
n$^1$ to n$^2$ each independently represent a natural number of 1 to 20.

4. The golf ball according to claim 1, wherein (d) the terpene-based resin is at least one member selected from the group consisting of an α-pinene-phenol copolymer, an α-pinene-α-methylstyrene copolymer, an α-pinene-α-methylstyrene-phenol copolymer, a β-pinene-phenol copolymer, a β-pinene-α-methylstyrene copolymer, and a β-pinene-α-methylstyrene-phenol copolymer.

5. The golf ball according to claim 1, wherein (d) the terpene-based resin has a softening point in a range of from 60° C. to 150° C.

6. The golf ball according to claim 1, wherein the core rubber composition contains (d) the terpene-based resin in an amount of from 3 parts by mass to 20 parts by mass with respect to 100 parts by mass of (a) the base rubber.

7. The golf ball according to claim 1, wherein a blending ratio (component (b)/component (d)) of the component (b) to the component (d) ranges from 2.0 to 15.0 in a mass ratio.

8. The golf ball according to claim 1, wherein the polybutadiene is a high-cis polybutadiene having a cis-1,4 bond in an amount of 90 mass % or more.

9. The golf ball according to claim 1, wherein a hardness (H75) at a point located at a distance of 75% of a core radius from a center of the core ranges from 55 to 80 in Shore C hardness.

10. The golf ball according to claim 1, wherein a surface hardness (Hs) of the core ranges from 60 to 83 in Shore C hardness.

11. The golf ball according to claim 1, wherein a central hardness (Ho) of the core ranges from 30 to 70 in Shore C hardness.

12. The golf ball according to claim 1, wherein a hardness difference (Hs–Ho) between a surface hardness (Hs) of the core and a central hardness (Ho) of the core ranges from 5 to 35 in Shore C hardness.

13. The golf ball according to claim 1, wherein a hardness difference (H75–Ho) between a hardness (H75) at a point located at a distance of 75% of a core radius from a center of the core and a central hardness (Ho) of the core ranges from 3 to 20 in Shore C hardness.

14. The golf ball according to claim 2, wherein the terpene-phenol copolymer has an acid value in a range of from 10 mgKOH/g 300 mgKOH/g.

15. The golf ball according to claim 2, wherein the terpene-phenol copolymer has a hydroxy value in a range of from 30 mgKOH/g to 150 mgKOH/g.

16. The golf ball according to claim 1, wherein the core rubber composition contains (d) the terpene-based resin in an amount of from 3 parts by mass to 20 parts by mass with respect to 100 parts by mass of (a) the base rubber, and
the terpene-based resin is at least one member selected from the group consisting of compounds having a structure represented by the following formulae (1) to (4):

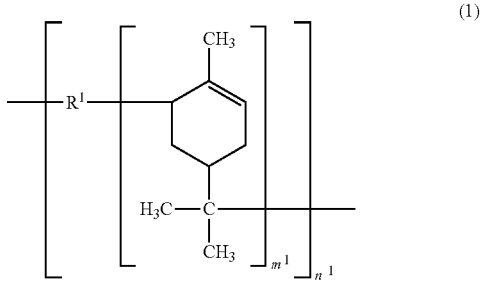

-continued

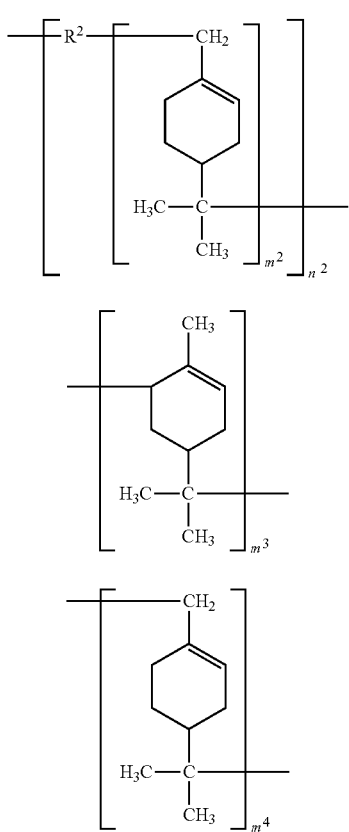

wherein in the formulae (1) to (4),
R$^1$ and R$^2$ each independently represent a divalent residue of a phenol-based compound and/or a styrene-based compound,
m$^1$ to m$^4$ each independently represent a natural number of 1 to 30, and
n$^1$ to n$^2$ each independently represent a natural number of 1 to 20.

17. A golf ball comprising a core and at least one cover covering the core, wherein
the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin; and wherein
(d) the terpene-based resin is at least one member selected from the group consisting of a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer, and has a softening point in a range of from 110° C. to 150° C.

18. A golf ball comprising a core and at least one cover covering the core, wherein
the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin;
the core rubber composition contains (d) the terpene-based resin in an amount of from 3 parts by mass to 20 parts by mass with respect to 100 parts by mass of (a) the base rubber; and
(d) the terpene-based resin is at least one member selected from the group consisting of an α-pinene-phenol copolymer, an α-pinene-α-methylstyrene copolymer, an α-pinene-α-methylstyrene-phenol copolymer, a β-pinene-phenol copolymer, a β-pinene-α-methylstyrene copolymer, and a β-pinene-α-methylstyrene-phenol copolymer.

19. A golf ball comprising a core and at least one cover covering the core, wherein
the core is formed from a core rubber composition consisting of (a) a base rubber containing a polybutadiene, (b) an α,β-unsaturated carboxylic acid having 3 to 8 carbon atoms and/or a metal salt thereof as a co-crosslinking agent, (c) a crosslinking initiator, (d) a terpene-based resin, and optionally at least one component selected from the group consisting of
an organic sulfur compound,
a metal hydroxide,
a metal oxide selected from magnesium oxide, calcium oxide, zinc oxide, and copper oxide,
a metal carbonate, barium sulfate, tungsten powder, molybdenum powder,
a pigment,
an antioxidant,
a peptizing agent, and
a softening agent; and
(d) the terpene-based resin is at least one member selected from the group consisting of an α-pinene polymer, a β-pinene polymer, a limonene polymer, a dipentene polymer, a β-pinene/limonene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer, and has a softening point in a range of from 110° C. to 150° C.

* * * * *